(12) United States Patent
Salame et al.

(10) Patent No.: US 11,031,766 B2
(45) Date of Patent: Jun. 8, 2021

(54) CABLE ACCESSORY WITH IMPROVED THERMAL CONDUCTIVITY

(71) Applicant: NEXANS, Courbevoie (FR)

(72) Inventors: Basil Salame, Lyons (FR); Adrien Charmetant, Lyons (FR); Mickael Laurent, Lyons (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/371,862

(22) Filed: Apr. 1, 2019

(65) Prior Publication Data
US 2019/0341762 A1 Nov. 7, 2019

(30) Foreign Application Priority Data

Apr. 5, 2018 (FR) .................................... 18 52973

(51) Int. Cl.
| | |
|---|---|
| H01B 3/12 | (2006.01) |
| H02G 15/18 | (2006.01) |
| H01B 3/46 | (2006.01) |
| H01B 7/29 | (2006.01) |
| H02G 1/14 | (2006.01) |
| C08K 3/34 | (2006.01) |
| C08K 3/38 | (2006.01) |

(52) U.S. Cl.
CPC ............... *H02G 15/18* (2013.01); *H01B 3/12* (2013.01); *H01B 3/46* (2013.01); *H01B 7/292* (2013.01); *H02G 1/14* (2013.01); *C08K 3/34* (2013.01); *C08K 3/38* (2013.01); *C08K 2003/385* (2013.01)

(58) Field of Classification Search
CPC ..................................................... H01B 3/12
USPC ....................................................... 174/75 R
See application file for complete search history.

(56) References Cited

U.S. PATENT DOCUMENTS

| | | | | |
|---|---|---|---|---|
| 2005/0224767 | A1* | 10/2005 | Japp .................... | H05K 3/4602 252/570 |
| 2009/0091051 | A1 | 4/2009 | Champion et al. | |
| 2014/0216513 | A1* | 8/2014 | Mantese ................. | H01L 35/04 136/200 |
| 2015/0027132 | A1* | 1/2015 | Zhang ..................... | F25B 21/00 62/3.1 |
| 2015/0194240 | A1* | 7/2015 | Ranganathan ......... | H01B 7/292 174/126.2 |

(Continued)

FOREIGN PATENT DOCUMENTS

| | | | | |
|---|---|---|---|---|
| BE | 831816 | * | 11/1975 | ........... C01B 21/064 |
| CN | 103275357 | * | 9/2013 | ............. C08K 13/02 |

(Continued)

OTHER PUBLICATIONS

International Search Report dated Feb. 6, 2019.

*Primary Examiner* — Stanley Tso
(74) *Attorney, Agent, or Firm* — Sofer & Haroun, LLP

(57) ABSTRACT

The invention relates to a cable accessory, said accessory being surrounded by at least one electrically insulating crosslinked layer comprising at least one polymer material, boron nitride and silicon carbide, to an electrical device comprising at least said cable accessory, to a process for manufacturing said accessory and said device, to the use of said crosslinked layer around an electric cable accessory or in an electrical device, in particular for promoting heat discharge, to a kit for connecting electric cables, and to a cable accessory, said accessory comprising two fillers of different thermal conductivities.

15 Claims, 1 Drawing Sheet

(56) References Cited

U.S. PATENT DOCUMENTS

2016/0152794 A1* 6/2016 Diaham .................. C08K 3/38
                                                          428/220
2016/0258042 A1* 9/2016 Sanaty-Zadeh ......... C22C 21/00
2020/0323758 A1* 10/2020 Karagianni .............. A61Q 5/02

FOREIGN PATENT DOCUMENTS

CN      103 275 357         10/2015
FR            3015104    *   6/2015   ............... H01B 3/02

* cited by examiner

CABLE ACCESSORY WITH IMPROVED THERMAL CONDUCTIVITY

RELATED APPLICATION

This application claims the benefit of priority from French Patent Application No. FR 18 52973, filed on Apr. 5, 2018, the entirety of which is incorporated by reference.

BACKGROUND

Field of the Invention

The invention relates to a cable accessory, said accessory being surrounded by at least one electrically insulating crosslinked layer comprising at least one polymer material, boron nitride and silicon carbide, to an electrical device comprising at least said cable accessory, to a process for manufacturing said accessory and said device, to the use of said crosslinked layer around an electric cable accessory or in an electrical device, in particular for promoting heat discharge, to a kit for connecting electric cables, and to a cable accessory, said accessory comprising two fillers of different thermal conductivities.

The invention applies typically but not exclusively to the field of high-voltage power cables (said voltage in particular being greater than 60 kV), and in particular the field of cable accessories such as cable joints, in particular high voltage direct current joints (HVDC joints) or high voltage alternating current joints (HVAC joints).

Description of Related Art

The problem of overheating in cable joints is well known. It results in an increase in the temperature between the cable and the hottest point of the joint of said cable. This can have many consequences, such as degradation of the underlying polymer layers, risks of breakdown and/or an electrical failure.

An inorganic thermal protection layer comprising from 5 to 30% by weight of an inorganic adhesive such as a metal silicate, from 2 to 20% by weight of one or more emissivity agents such as boron nitride, and from 45 to 92% by weight of a filler such as a metal oxide is known from International Application WO 2015/053796 A1. This layer can make it possible to lower the temperature of a cable or of a cable accessory. However, this thermal protection layer is not very flexible, and it can prove difficult to install around a cable accessory, in particular by virtue of the variation in diameters of the different sections along such an accessory, in particular when it is connected to one or more cables. Finally, the thermal conductivity of such a layer is not measured.

OBJECTS AND SUMMARY

The objective of the invention is therefore to overcome the drawbacks of the prior art by providing a cable accessory surrounded by a layer having an improved thermal conductivity, while at the same time guaranteeing good mechanical properties, in particular in terms of flexibility, and/or good electrical installation and/or watertightness properties, it being possible for said layer to adapt to any type of variation in diameter of the sections along an accessory.

Another objective of the invention is to provide a simple, economical process which is easy to implement and which makes it possible to produce a cable accessory having the abovementioned properties.

A first subject of the present invention is an electric cable accessory, characterized in that said accessory is surrounded by at least one electrically insulating crosslinked layer comprising at least one polymer material, boron nitride and silicon carbide.

By virtue of the combination of the polymer material, the boron nitride and the silicon carbide, the crosslinked layer has an improved thermal conductivity, inducing better discharge of the heat generated within the accessory. Moreover, it has good electrical insulation properties, and in particular protects the accessory against overvoltages. The crosslinked layer is easy to produce and to install, and it makes it possible to uniformly thermally protect a cable accessory and optionally the parts of the cable(s) connected to the accessory, whether they are the structure and/or the contours specific to the accessory and optionally to said parts. In addition, the crosslinked layer is flexible, which allows it to easily fit the structure and/or the contours specific to the accessory and optionally to the parts of the cable(s) connected to the accessory.

In the invention, the expression "cable accessory" means an accessory intended to be connected to a cable.

The crosslinked layer may comprise approximately from 1 to 30% by weight, and preferably approximately from 2 to 20% by weight of boron nitride, relative to the total weight of the crosslinked layer.

The crosslinked layer may comprise approximately from 2 to 40% by weight, and preferably approximately from 5 to 30% by weight of silicon carbide, relative to the total weight of the crosslinked layer.

According to one particularly preferred embodiment of the invention, the crosslinked layer comprises approximately from 5 to 15% by weight of boron nitride, and approximately from 15 to 25% by weight of silicon carbide, relative to the total weight of the crosslinked layer. This thus makes it possible to obtain a good compromise in terms of thermal conductivity, production cost and flexibility of the crosslinked layer.

Advantageously, the weight ratio of boron nitride to silicon carbide ranges from 0.2 to 0.8.

According to one preferred embodiment, the crosslinked layer comprises at most 30% by weight of boron nitride and of silicon carbide. This makes it possible to improve the forming and/or the manufacture of the crosslinked layer (optimized viscosity of the crosslinkable composition as defined below).

In the invention, the expression "micrometric particles" means that at least one of the dimensions of the particles is greater than or equal to approximately 1 μm.

According to one particular embodiment, the boron nitride is in the form of micrometric particles, in particular having a size ranging approximately from 1 to 100 μm, and preferably ranging approximately from 1 to 70 μm. By virtue of such particle sizes, an optimized thermal conductivity is obtained, while at the same time guaranteeing good flexibility properties of the crosslinked layer.

According to one particular embodiment, the silicon carbide is in the form of micrometric particles, in particular having a size ranging approximately from 1 to 75 μm, and preferably ranging approximately from 1 to 25 μm. By virtue of such particle sizes, an improved thermal conductivity is obtained, while at the same time guaranteeing good flexibility properties of the crosslinked layer.

The boron nitride may be in the form of spherical particles or in the form of elongated particles.

When the boron nitride particles are spherical, they have a mean diameter preferentially ranging approximately from 30 to 60 μm.

The boron nitride is advantageously in the form of elongated particles. This thus makes it possible to increase the thermal conduction paths within the crosslinked layer. The boron nitride may in particular be in the form of rods.

When the boron nitride particles are elongated, they have a mean length preferentially ranging approximately from 7 to 9 μm, and a mean width preferentially ranging approximately from 200 to 300 nm.

The silicon carbide is preferably in the form of spherical particles. This thus makes it possible to increase the contact surface within the crosslinked layer.

According to one particularly preferred embodiment of the invention, the boron nitride is in the form of elongated particles and the silicon carbide is in the form of spherical particles. This thus makes it possible to improve the thermal conductivity of the crosslinked layer. In particular, the interactions between the boron nitride particles and the silicon carbide particles are promoted within the crosslinked layer.

In the invention, the size, the mean diameter, the mean length or the mean width of the particles is preferably measured using a scanning electron microscope.

Preferably, the crosslinked layer comprises at most 1% by weight of, preferably at most 0.5% by weight of, particularly preferably at most 0.01% by weight of, and more particularly preferably does not comprise, nitride(s) other than boron nitride, such as aluminium nitride or silicon nitride.

Preferably, the crosslinked layer comprises at most 10% by weight of, preferably at most 5% by weight of, particularly preferably at most 1% by weight of, and more particularly preferably does not comprise, alumina.

The polymer material may comprise one or more polymer (s), it being possible for the term "polymer" to be understood to mean any type of polymer well known to those skilled in the art, such as a homopolymer or a copolymer (e.g. block copolymer, random copolymer, terpolymer, etc.).

The crosslinked layer may comprise at least approximately 50% by weight, and preferably at least approximately 60% by weight of polymer material, relative to the total weight of the crosslinked layer.

Advantageously, the crosslinked layer comprises from 55% to 85% by weight, and preferably approximately from 60% to 80% by weight of polymer material, relative to the total weight of the crosslinked layer.

The polymer material may be of the thermoplastic or elastomer type.

The polymer material is preferably chosen from polyorganosiloxanes.

A polyorganosiloxane generally comprises silicon, oxygen, hydrogen and carbon. In particular, a part of the silicon and of the oxygen forms units of Si—O—Si type.

According to one preferred embodiment of the invention, a polyorganosiloxane suitable as polymer material in the crosslinked layer of the invention comprises units of formula (I) below:

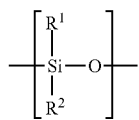

(I)

in which the $R^1$ and $R^2$ groups, which may be identical to or different from one another and from one unit to the other, are hydrocarbon-based groups, in particular chosen from alkyl, haloalkyl, cycloalkyl, aralkyl, cyanoalkyl, alkenyl, haloalkenyl, cycloalkenyl, aryl, haloaryl and alkylaryl groups.

The polyorganosiloxane may comprise n units of formula (I) [—Si($R^1$)($R^2$)—O—]. n is preferably greater than or equal to 5, and more preferably between 5 and 10 000.

The alkyl, haloalkyl, aralkyl, alkylaryl and cyanoalkyl groups can have from 1 to 20 carbon atoms, preferably from 1 to 6 carbon atoms, and more preferably from 1 to 3 carbon atoms.

The alkenyl and haloalkenyl groups can have from 2 to 10 carbon atoms, and preferably from 2 to 6 carbon atoms.

The cycloalkyl, cycloalkenyl, aryl and haloaryl groups can have from 3 to 10 carbon atoms, and preferably from 3 to 6 carbon atoms.

$R^1$ (respectively $R^2$) is preferably an alkyl group, and more preferably a methyl group.

The polyorganosiloxane may correspond to formula (II) below:

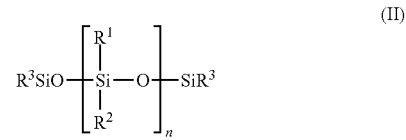

(II)

in which $R^1$, $R^2$ and n have the same definition as above, and $R^3$ represents a hydrocarbon-based group, in particular chosen from alkyl, alkenyl and alkoxyalkyl groups.

The alkyl and alkenyl groups are as defined above.

The alkoxyalkyl groups can have from 1 to 10 carbon atoms, preferably from 1 to 6 carbon atoms, and more preferably from 1 to 3 carbon atoms.

According to one particularly preferred embodiment of the invention, the polymer material is chosen from silicone elastomers (or silicone rubbers). These have the advantage of conferring on the layer excellent chemical inertia and good fire resistance.

The crosslinked layer can have a thermal conductivity of at least 0.18 W/m·K, preferably of at least 0.20 W/m·K, more preferably of at least 0.25 W/m·K, and more preferably of at least 0.3 W/m·K, more preferably of at least 0.35 W/m·K, and more preferably of at least 0.40 W/m·K, in particular at 35° C.

The thermal conductivity of the crosslinked layer can be measured using an instrument sold under the trade name Hot Disk TPS 2500S, by the company Hot Disk, at approximately 35° C.

By virtue of a good thermal conductivity of the crosslinked layer, the discharge of the heat generated at the level of the accessory is facilitated, without however degrading the electrical and mechanical properties of the accessory.

The layer of the invention is a crosslinked layer. In the present invention, the crosslinked layer can be for example characterized by the determination of its gel content or degree of crosslinking, in particular determined by extraction of a sample of said layer in xylene at 100° C. for 24 hours.

More particularly, the crosslinked layer can have a gel content, or degree of crosslinking, of at least 50%, preferably of at least 60%, preferably of at least 70%, and particularly preferably of at least 80%.

In the present invention, the term "electrically insulating layer" is intended to mean a layer of which the electrical conductivity can be at most $1\times10^{-9}$ S/m, and preferably at most $1\times10^{-10}$ S/m (siemens per metre) (at 25° C.).

The crosslinked layer is preferably in the form of a gel. This thus makes it possible to give it sufficient flexibility to be able to fit the structure and/or the contours of the accessory and/or to obtain good watertightness properties.

Advantageously, the crosslinked layer is a non-porous layer.

The layer can be crosslinked by techniques well known to those skilled in the art.

The crosslinked layer can advantageously have a variable thickness, in particular along the part of the electric cable accessory to be protected. It may be a continuous envelope, in particular made of a single piece.

The crosslinked layer of the accessory of the invention can advantageously be obtained from a crosslinkable composition comprising boron nitride, silicon carbide and at least one precursor of said polymer material.

According to one particularly preferred embodiment of the invention, the crosslinkable composition comprises approximately from 2 to 20% by weight of boron nitride, and approximately from 5 to 30% by weight of silicon carbide, and preferably approximately from 5 to 15% by weight of boron nitride, and approximately from 15 to 25% by weight of silicon carbide, relative to the total weight of the crosslinkable composition. This thus makes it possible to obtain a good compromise in terms of thermal conductivity, production cost and processability of the crosslinkable composition.

The crosslinkable composition may comprise approximately from 55% to 85% by weight, and preferably approximately from 60% to 80% by weight of precursor of said polymer material, relative to the total weight of the crosslinkable composition.

The precursor of said polymer material can be chosen from a crosslinkable oligomer, a crosslinkable polymer, and a monomer of said polymer material.

The precursor of said polymer material preferably has at least one reactive function. This thus makes it possible to promote the polymerization and/or the crosslinking in order to obtain said polymer material of the crosslinked layer.

According to one preferred embodiment of the invention, the precursor of said polymer material is a polyorganosiloxane precursor, and more preferably a silicone elastomer precursor.

In this embodiment, the reactive functions of the precursor can be chosen from Si—H functions, Si—$(C_2\text{-}C_6)$alkenyl (e.g. Si-vinyl) functions and Si—O$(C_1\text{-}C_6)$alkyl functions.

According to one preferred embodiment, the polyorganosiloxane precursor is:
- a crosslinkable polymer comprising at least one Si—H reactive function and at least one Si—$(C_2\text{-}C_6)$alkenyl (e.g. Si-vinyl) reactive function,
- at least one monomer chosen from siloxanes, alkoxysilanes and alkylsilanes, said monomer comprising at least one reactive function chosen from Si—H and Si—$(C_2\text{-}C_6)$alkenyl (e.g. Si-vinyl) functions, or
- at least two monomers chosen from siloxanes, alkoxysilanes and alkylsilanes, one of said monomers comprising at least one Si—H reactive function such as a dialkoxyalkylsilane, and the other of said monomers comprising at least one Si—$(C_2\text{-}C_6)$alkenyl (e.g. Si-vinyl) reactive function such as an alkenyl(dialkyl)alkoxysilane.

The crosslinkable composition may also comprise a crosslinking catalyst, in particular a platinum-based compound. It may be chosen from platinum metal, platinum salts such as platinum chlorides (e.g. platinum dichloride: $PtCl_2$, platinum tetrachloride: $PtCl_4$) and also from platinum-based complexes such as the Karstedt catalyst which is a complex of platinum(0) and of divinyltetramethylsiloxane.

According to one particularly preferred embodiment of the invention, the amount of crosslinking agent within the crosslinkable composition ranges approximately from 0.1 to 8% by weight, relative to the total weight of polymer material(s) and/or of polymer material precursors.

The crosslinkable composition according to the invention may comprise a crosslinking agent such as for example an organic peroxide.

In one particular embodiment, the organic peroxide that can be used according to the invention is a di-tertiary alkyl or arylalkyl peroxide, preferably chosen from di-tert-butyl peroxide, 2,4-dichlorobenzoyl peroxide (DCBP), di(tert-butylperoxyisopropyl)benzene peroxide, dicumyl peroxide, and 2,5-dimethyl-2,5-di(tert-butylperoxy)hexane (DBPH).

The amount of organic peroxide in the crosslinkable composition may range approximately from 0.1 to 8% by weight, relative to the total weight of polymer material(s) and/or of polymer material precursors.

The crosslinked layer acts as electrical, mechanical and thermal protection for the electric cable accessory. It may at least partially or totally surround said accessory.

It is preferably a layer independent of the accessory. In other words, it can be separated from the cable accessory without causing the slightest mechanical and/or electrical damage to said cable accessory, and in particular without causing the slightest damage to the outermost layer of the cable accessory.

In other words, the crosslinked layer is preferably not an integral part of the cable accessory as such, thus making it possible to preserve the electrical and/or mechanical integrity of the cable accessory. More particularly, the electrical and mechanical properties of the cable accessory to which the crosslinked layer is linked remain intact.

The crosslinked layer of the invention may surround the outermost component of the accessory or the outermost layer of the accessory.

The crosslinked layer is preferably in direct physical contact with the accessory, and in particular with the outermost component or the outermost layer of the accessory.

The electric cable accessory is preferably intended to surround at least one part or end of an electric cable.

The accessory preferably comprises at least one semi-conducting component and at least one electrically insulating component, these components being intended to surround at least one part or end of an electric cable.

The semi-conducting component is well known for controlling the geometry of the electric field, when the electric cable, intended to be linked to said accessory, is under voltage.

The accessory can typically be a hollow longitudinal body, such as for example an electric cable joint. The joint makes it possible in particular to connect two electric cables together, the joint being intended to surround at least one part or end of these two electric cables.

According to one particularly preferred embodiment of the invention, the accessory is an electric cable joint comprising:
- a first semi-conducting component, in particular surrounding one part or end of the two electric cables, an electrically insulating component, in particular surrounding the first semi-conducting component and one part or end of the two electric cables, and a second semi-conducting component, in particular surrounding one part or end of the two electric cables.

The first semi-conducting component and the second semi-conducting component are preferably separated by the electrically insulating component.

The joint may also comprise one or more filler layers surrounding the second semi-conducting component.

The joint may also comprise a third semi-conducting component, in particular surrounding the electrically insulating component.

The joint may also comprise a layer of a self-amalgamating material surrounding the third semi-conducting component, said layer of a self-amalgamating material being preferentially surrounded by a copper knit, in particular attached to said layer by means of a polyvinyl chloride (PVC) tape.

A second subject of the invention is an electrical device comprising:
at least one electric cable, and
an accessory surrounding at least one part or end of said electric cable,
characterized in that the accessory is as defined in the first subject of the invention.

The electric cable may be a terrestrial, underground or undersea cable.

The crosslinked layer advantageously surrounds at least one part or end of said electric cable.

In the present invention, the term "electric cable" is intended to mean an electric cable comprising at least one elongated electrically conductive component, and at least one polymer layer or one electrically insulating layer, said polymer layer or electrically insulating layer surrounding the elongated electrically conductive component.

The elongated electrically conductive component of the electric cable may be a metal wire (single-stranded) or a plurality of metal wires (multistranded), possibly twisted, in particular made of copper or aluminium, or an alloy thereof.

The electric cable is preferably a high-voltage electric cable (voltage in particular greater than 60 kV).

More particularly, the electric cable of the device may comprise:
an elongated electrically conductive component,
a first semi-conducting layer surrounding the elongated electrically conductive component,
an electrically insulating layer surrounding the first semi-conducting layer, and
a second semi-conducting layer surrounding the electrically insulating layer.

The second semi-conducting layer may be surrounded by an earth and/or protective metal shield.

The second semi-conducting layer may be surrounded by an outer protective sheath, this protective sheath surrounding the metal shield when it exists.

The electric cable may also comprise, between the elongated electrically conductive component and the first semi-conductive layer, one or more tapes, in particular which make it possible to assembly the strands of the elongated electrically conductive component when it is multistranded.

The electric cable may also comprise one or more swellable layers, preferably in the form of one or more strip(s) between the second semi-conducting layer and the metal shield when it exists and/or between the metal shield and the outer sheath when they exist. The swellable layers make it possible to ensure the longitudinal watertightness of the electric cable.

When the accessory is a joint, the electrical device may also comprise a second electric cable, in particular as defined above. The joint then makes it possible to connect the two electric cables together.

According to one particular embodiment, the joint surrounds at least one part or end of each of said electric cables. More particularly, the end of each cable intended to be connected is placed inside said joint.

According to this embodiment, the crosslinked layer may surround at least one part or end of each of said electric cables, in particular at the level of the joint, and the joint.

The device may also comprise a component for positioning or protecting the crosslinked layer, said component surrounding the crosslinked layer.

Said positioning or protecting component is preferably configured to enable step i) to be carried out as described below. In other words, said positioning or protecting component preferably enables the application of the crosslinkable composition.

The protecting component may be a metal component. This component may be the outermost component of the device.

The metal of the metal component may be chosen from copper or a copper alloy.

This protecting component can ensure the mechanical protection of the accessory, and in particular of the joint, within the device. It is preferably made of a rigid material. The protecting component can also make it possible to position the crosslinked layer around the accessory and in particular around the joint.

The protecting component may be a sleeve.

The positioning component may be made of metal (e.g. copper) or of a polymer material (e.g. polyethylene).

The positioning component may make it possible to position the crosslinked layer around the accessory and in particular around the joint. Once the crosslinked layer has been positioned, this positioning component can be removed, and for example replaced with the protecting element. It then acts for example as a mould.

A third subject of the invention is the use of a crosslinked layer as defined in the present invention, around an electric cable accessory or in an electrical device, in particular for promoting heat discharge.

The crosslinked layer is as defined in the invention.

The accessory and the device may be as defined in the invention.

A fourth subject of the invention relates to a process for manufacturing an electric cable accessory in accordance with the first subject of the invention, characterized in that it comprises at least the following steps:
a step i) of applying a crosslinkable composition as defined in the first subject of the invention, around an electric cable accessory (e.g. accessory free of the crosslinked layer), and
a step ii) of crosslinking the crosslinkable composition.

At the end of steps i) and ii), the accessory of step i) is surrounded (at least partially or totally) by the crosslinked layer.

The crosslinkable composition and the crosslinked layer are as defined in the invention.

Step i) can be carried out by pouring the crosslinkable composition onto the accessory, preferably manually.

Step i) is preferably carried out at ambient temperature (i.e. 18-25° C.).

Steps i) and ii) may be concomitant. In particular, the crosslinking may begin during the application of the crosslinkable composition around the accessory (step i)), and may end at the end of step ii).

Step ii) may be carried out at ambient temperature (i.e. 18-25° C.) or thermally, in particular at a temperature of greater than 25° C., in particular ranging approximately from 30 to approximately 200° C., and preferably ranging from 35 to 60° C.

In the present invention, the crosslinking temperature and the crosslinking time of the crosslinked layer used depend in particular on the thickness of the layer, on the number of layers, on the presence or absence of a crosslinking catalyst, on the type of crosslinking, etc.

Those skilled in the art will be able to easily determine these parameters by monitoring the change in the crosslinking through the determination of the gel content, in order to obtain a crosslinked layer.

Step ii) (respectively step i)) can be carried out under pressure, in particular by means of a pump. This thus makes it possible to avoid the formation of air bubbles in the crosslinked layer.

The process may also comprise, before step i), a step $i_0$) of preparing the crosslinkable composition.

Step $i_0$) may comprise mixing the boron nitride, the silicon carbide and a polymer material or at least one precursor of a polymer material, as defined in the first subject of the invention.

Step $i_0$) is preferably carried out by means of a mixer.

Steps $i_0$) and ii) may be concomitant. In this case, the crosslinking may begin as the preparation of the crosslinkable composition begins (step $i_0$)), and may end at the end of step ii).

It is preferable for the crosslinking ii) to begin after steps $i_0$) and i), in particular in order to facilitate step i).

The accessory used in step i) is preferably a joint.

A fifth subject of the invention is a process for manufacturing a device in accordance with the second subject of the invention, characterized in that it comprises at least the following steps:
 a step a) of installing an electric cable accessory (e.g. accessory free of the crosslinked layer), and
 steps i) and ii) as defined in the fourth subject of the invention.

Step a) may be carried out by applying an accessory around at least one part or end of an electric cable.

When the accessory is a joint, step a) may in particular make it possible to install a cable joint surrounding at least two electric cables.

Preferably, step a) may be carried out by welding the ends of two electric cables intended to be connected, and by applying the joint around the ends of two electric cables intended to be connected.

The process may also comprise, before step i), a step $i_0$) as defined in the fourth subject of the invention.

The process may also comprise, before step i) or before step $i_0$), a step $a_1$) of applying a component for positioning or protecting the crosslinked layer as defined in the invention, around the accessory, the positioning or protecting component being configured to enable step i) to be carried out.

At the end of step $a_1$), the positioning or protecting component surrounds the crosslinked layer.

Step $a_1$) is generally carried out between steps a) and i), or a) and $i_0$). According to this embodiment, the cable accessory is first installed according to step a), then the positioning or protecting component is applied around the accessory according to step $a_1$), then the crosslinked layer is formed around the accessory according to steps i), ii) [and optionally $i_0$) before step i)] as defined in the invention.

In other words, in this embodiment, the configuration of the positioning or protecting component is such that it enables the application of the crosslinkable composition around the accessory according to step i).

By way of example, the positioning or protecting component may comprise one or more orifices for enabling step i).

Moreover, the positioning or protecting component may be configured (in terms of its shape and its size) so that, at the end of step $a_1$), a sufficient space is formed between the accessory, in particular the external surface of the accessory, and said component. This thus makes it possible to facilitate the diffusion of the crosslinkable composition and the crosslinking thereof in said space during steps i) and ii).

When the component is a positioning component as defined in the third subject of the invention, said component may be removed after step ii), as long as the crosslinked layer is formed around the accessory. The process may then also comprise a step of applying a protecting component as defined in the third subject of the invention, around the crosslinked layer.

A sixth subject of the invention is a kit for connecting two electric cables by means of a joint as defined in the invention, characterized in that it comprises:
 boron nitride,
 silicon carbide, and
 at least one precursor of said polymer material,
 the abovementioned compounds being intended to form a crosslinkable composition as defined in the invention, and
 a component for positioning or protecting the crosslinked layer as defined in the invention, said component being configured to enable the application of the crosslinkable composition (cf. step i) of the process as described above).

A seventh subject of the invention is an electric cable accessory, characterized in that said accessory is surrounded by at least one electrically insulating crosslinked layer comprising at least one polymer material, at least one first filler having a thermal conductivity $CT_1$ (in $W \cdot m^{-1} \cdot K^{-1}$) at 35° C., and at least one second filler having a thermal conductivity $CT_2$ (in $W \cdot m^{-1} \cdot K^{-1}$) at 35° C. such that $CT_2 \geq CT_1 + 40\ W \cdot m^{-1} \cdot K^{-1}$.

The first and second fillers are preferably of different chemical nature. In other words, they have different chemical compositions.

The first filler may have a thermal conductivity $CT_1$ of at most 300 $W \cdot m^{-1} \cdot K^{-1}$ at 35° C.

The second filler may have a thermal conductivity $CT_2$ of at least 340 $W \cdot m^{-1} \cdot K^{-1}$ at 35° C., and preferably of at least 350 $W \cdot m^{-1} \cdot K^{-1}$ at 35° C.

The crosslinked layer of the accessory may be advantageously obtained from a crosslinkable composition comprising the first filler, the second filler and at least one precursor of said polymer material.

The accessory, the electrically insulating crosslinked layer, the polymer material and the precursor of said polymer material may be as defined in the first subject of the invention.

According to one particularly preferred embodiment of the invention, the first filler is boron nitride. The boron nitride may be as defined in the first subject of the invention.

According to one particularly preferred embodiment of the invention, the second filler is silicon carbide. The silicon carbide may be as defined in the first subject of the invention.

Other features and advantages of the present invention will emerge in the light of the description of a non-limiting example of a device according to the invention given with reference to the figures.

EXAMPLES

Detailed Description

For reasons of clarity, only the components essential for understanding the invention have been represented diagrammatically, said diagram not being to scale.

Figure 1:
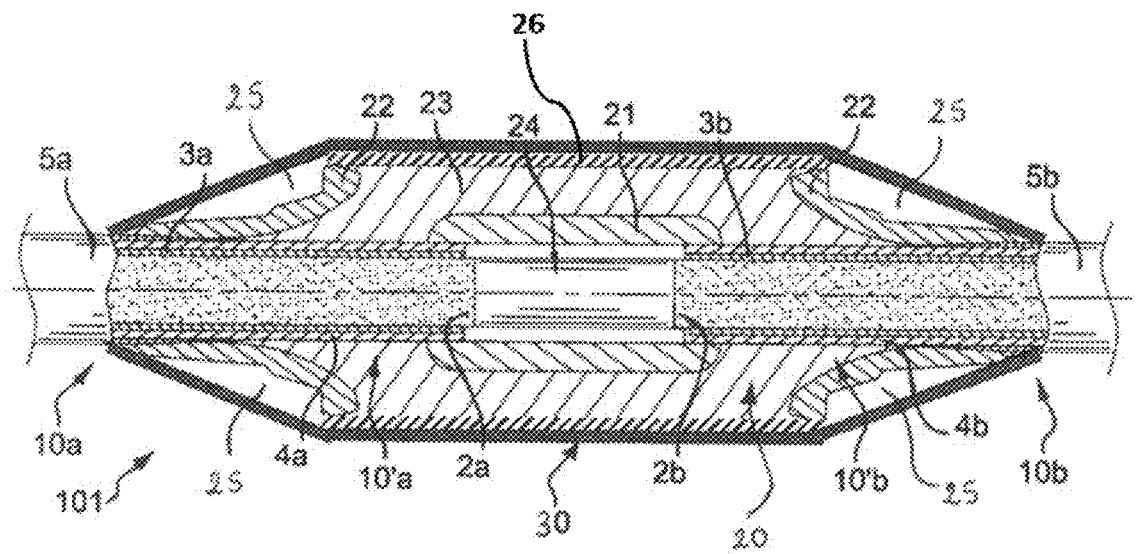
FIG. 1 represents a diagrammatic view of a device in longitudinal section according to the invention, comprising two electric cables linked to a joint, the assembly being surrounded by a crosslinked layer as defined in the invention.

FIG. 1 represents a device 101 comprising a joint 20 partly surrounding two electric cables 10a and 10b, and also a crosslinked layer 30 according to the invention surrounding the joint 20 and at least one part of the two electric cables 10a and 10b.

This crosslinked layer 30 surrounds the joint 20 and at least one part or end of the electric cables 10a and 10b.

More particularly, the crosslinked layer 30 extends along the device 101 around a part of the electric cable 10a, a part of the electric cable 10b, and all of the joint 20.

By way of example of electric cables and joint, the electric cables 10a and 10b and also the joint 20 of FIG. 1 can more particularly be described.

The electric cables 10a and 10b comprise, respectively, an end 10'a and an end 10'b, intended to be electrically connected and surrounded by the joint 20.

The body of the joint 20 comprises a first semi-conductive component 21 and a second semi-conductive component 22, separated by an electrically insulating component 23, said semi-conductive components 21, 22 and said electrically insulating component 23 surrounding the ends 10'a and 10'b respectively of the electric cables 10a and 10b. The electrically insulating component 23 surrounds the first semi-conductive component.

The first electric cable 10a comprises an elongated electrically conductive component 2a, a first semi-conducting layer 3a surrounding the elongated electrically conductive component 2a, an electrically insulating layer 4a surrounding the first semi-conducting layer 3a, and a second semi-conducting layer 5a surrounding the electrically insulating layer 4a.

The second electric cable 10b comprises an elongated electrically conductive component 2b, a first semi-conducting layer 3b surrounding the elongated electrically conductive component 2b, an electrically insulating layer 4b surrounding the first semi-conducting layer 3b, and a second semi-conducting layer 5b surrounding the electrically insulating layer 4b.

The elongated electrically conductive components 2a and 2b respectively of the first electric cable 10a and of the second electric cable 10b are welded at their ends 10'a and 10'b at the level of the zone 24, so as to electrically connect said cables.

The second semi-conducting layer 5a, 5b is at least partially stripped so that the electrically insulating layer 4a, 4b is at least partially positioned inside the joint 20, without being covered by the second semi-conducting layer 5a, 5b of the cable.

Inside the joint 20, the electrically insulating layers 4a, 4b are directly in physical contact with the electrically insulating component 23 and the first semi-conductive component 21 of the joint 20. The second semi-conducting layers 5a, 5b are directly in physical contact with the second semi-conductive component 22 of the joint 20.

The joint 20 may also comprise one or more filler layers 25 surrounding the second semi-conductive component 22.

The joint 20 may also comprise a third semi-conductive component 26, in particular surrounding the electrically insulating component 23.

The joint 20 may also comprise a layer of a self-amalgamating material surrounding the third semi-conductive component, said layer of a self-amalgamating material being preferentially surrounded by a copper knit, in particular attached to said layer by means of a polyvinyl chloride (PVC) tape.

Manufacture of a Device in Accordance with the Invention

A cable joint was applied around the ends, joined end to end and welded, of two high-voltage electric cables sold under the trade name VM-A/HOP. The joint surrounds at least the two ends of said cables. The joint comprises: a first semi-conductive component surrounding said ends, an insulating component surrounding said first semi-conductive component and said ends, and a second semi-conductive component surrounding said ends. The joint also comprises a third semi-conductive component surrounding the electrically insulating component, a layer of a self-amalgamating material surrounding the third semi-conductive component, and filler layers surrounding the second semi-conductive component.

A metal envelope made of copper was applied around the joint, so as to surround the joint and at least one part or end of said electric cables.

2 kg of boron nitride sold under the trade name Powder Cooling Filler Platelets by the company 3M Technical Ceramics and 4 kg of silicon carbide sold under the trade name SIKA TECH by the company Saint-Gobain Ceramic Materials GmBH were mixed with a precursor of a silicone elastomer sold under the trade name Bluesil RT Gel 8213 A, so as to form a first composition. In parallel, 2 kg of boron nitride and 4 kg of silicon carbide as described above were mixed with a precursor of a silicone elastomer sold under the trade name Bluesil RT Gel 8213 B so as to form a second composition. One of the abovementioned compositions comprises a platinum-based crosslinking catalyst. Each of the abovementioned two compositions were homogenized using a mixer sold under the trade name DAC 400 Mixer by the company Speed Mixer.

The abovementioned two compositions were then combined and mixed, so as to form a resulting crosslinkable composition.

The resulting crosslinkable composition was then poured manually into the space formed between the outermost layer of the joint and the metal envelope. During the filling step, a pump is used to eliminate any possible gas bubbles formed within the crosslinkable composition.

The composition was crosslinked for approximately 24 hours at ambient temperature (e.g. 18-25° C.) so as to form a crosslinked layer C1 surrounding said joint.

By way of comparison, a crosslinked layer CA without boron nitride and without silicon carbide was prepared according to the same process as that used for the layer C1. The crosslinked layer CA is not therefore part of the invention.

The thermal conductivity of a sample of crosslinked layer C1 having the dimensions: 44 m×48 m×8 mm, and of a sample of crosslinked layer CA having the same dimensions, was measured using an instrument sold under the trade name Hot Disk TPS 2500S, by the company Hot Disk, at approximately 35° C.

The sample of crosslinked layer C1 has a thermal conductivity of 0.44 W/m·K at 35° C., and the sample of crosslinked layer CA has a thermal conductivity of 0.17 W/m·K at this same temperature.

Dielectric spectroscopy tests on a sample of crosslinked layer C1 having the dimensions: 44 mm×48 mm×1.52 mm, and on a sample of crosslinked layer CA having the same dimensions, were carried out using an instrument sold under the trade name Alpha Dielectric Analyzer by the company Novocontrol. The measurements were carried out at 1000 Volts, with frequencies ranging from 0.1 Hz to 10 000 Hz, in order to apply an electric field of 0.658 kV/mm.

These tests made it possible to determine the electrical dissipation factor (or loss factor) [evaluating on the basis of the tangent delta (tan δ) according to Standards IEC 60250 (1969) and IEC 62631, at ambient temperature, i.e. at 18-25° C.], as a function of the frequency.

Figure 2:
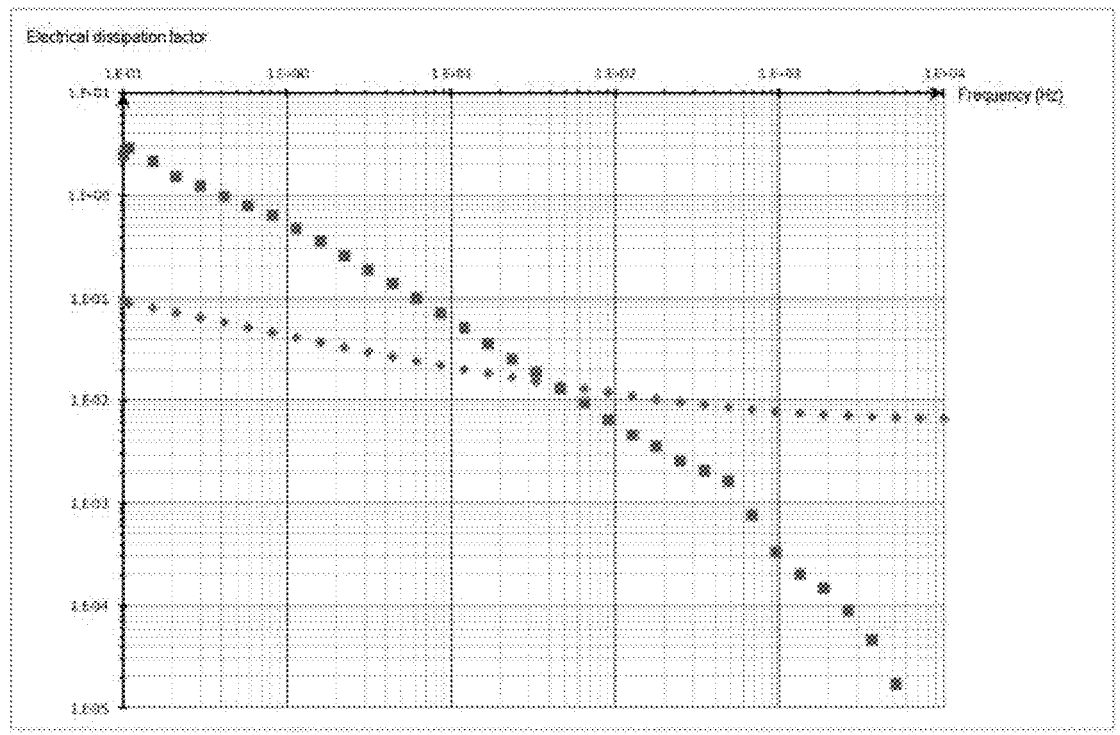
FIG. 2 shows the curve of the electrical dissipation factor as a function of the frequency (Hz), for the sample of crosslinked layer C1 according to the invention (curve with diamonds) and for the sample of crosslinked layer CA (curve with squares). The tangent of the loss angle gives an indication regarding the energy dissipated in a dielectric in the form of heat.

FIG. 2 shows the curve of the electrical dissipation factor as a function of the frequency (Hz), for the sample of crosslinked layer C1 according to the invention (curve with diamonds) and for the sample of crosslinked layer CA (curve with squares). The tangent of the loss angle gives an indication regarding the energy dissipated in a dielectric in the form of heat.

The curve of the crosslinked layer C1 of the invention has a negative slope, which shows that it has a capacitive (insulating) nature.

The value of the electrical conductivity of the crosslinked layer C1 was measured using an instrument sold under the trade name Alpha Dielectric Analyzer by the company Novocontrol. It is $2 \times 10^{-12}$ S/m for a frequency of 0.1 Hz and at most $10^{-9}$ S/m for frequencies below 100 Hz (frequencies used in direct current), which shows the insulating nature of such a crosslinked layer.

Other tests showed that the crosslinked layer surrounding the accessory makes it possible to obtain a decrease in the temperature of the hottest point of the joint of approximately 10° C.

The invention claimed is:

1. Electrical device comprising:
   at least one electric cable, and
   an accessory surrounding at least one part or end of said electric cable,
   wherein the accessory is surrounded by at least one electrically insulating crosslinked layer comprising at least one polymer material, boron nitride and silicon carbide, and
   wherein the silicon carbide and the boron nitride are in the form of micrometric particles,
   wherein the boron nitride is in the form of elongated particles, and
   wherein the silicon carbide is in the form of spherical particles.

2. Electrical device according to claim 1, wherein the accessory is a joint, and the electrical device also comprises a second electric cable, the joint surrounding at least one part or end of each of said electric cables.

3. Process for manufacturing a device as defined in claim 1, wherein said process comprises at least the following steps:
   a step a) of installing an electric cable accessory,
   a step i) of applying a crosslinkable composition comprising at least one precursor of said polymer material, the boron nitride and the silicon carbide, around said electric cable accessory, and
   a step ii) of crosslinking the crosslinkable composition.

4. Process according to claim 3, wherein said process also comprises, before step i), a step $a_1$) of applying a component for positioning or protecting the crosslinked layer, around the accessory, the positioning or protecting component being configured to enable step i) to be carried out.

5. Electrical device according to claim 1, wherein the crosslinked layer comprises from 1 to 30% by weight of boron nitride, relative to the total weight of the crosslinked layer.

6. Electrical device according to claim 1, wherein the crosslinked layer comprises from 2 to 40% by weight of silicon carbide, relative to the total weight of the crosslinked layer.

7. Electrical device according to claim 1, wherein the polymer material is chosen from polyorganosiloxanes.

8. Electrical device according to claim 1, wherein the crosslinked layer has a thermal conductivity of at least 0.18 W/m·K.

9. Electrical device according to claim 1, wherein the crosslinked layer is in direct physical contact with the accessory.

10. Electrical device according to claim 1, wherein said accessory is an electric cable joint.

11. Electrical device comprising:
    at least one electric cable, and
    an accessory surrounding at least one part or end of said electric cable,
    wherein the accessory is surrounded by at least one electrically insulating crosslinked layer comprising at least one polymer material, at least one first filler having a thermal conductivity $CT_1$ (in $W \cdot m^{-1} \cdot K^{-1}$) at 35° C., and at least one second filler having a thermal conductivity $CT_2$ (in $W \cdot m^{-1} \cdot K^{-1}$) at 35° C. such that $CT_2 \geq CT_1 + 40$ $W \cdot m^{-1} \cdot K^{-1}$, and
    wherein the first filler and the second filler are in the form of micrometric particles,
    wherein the first filler is in the form of elongated particles, and
    wherein the second filler is in the form of spherical particles.

12. Electrical device according to claim 11, wherein the polymer material is chosen from polyorganosiloxanes.

13. Electric cable accessory intended to surround at least one part or end of an electric cable, wherein said accessory is surrounded by at least one electrically insulating crosslinked layer comprising at least one polymer material, boron nitride and silicon carbide, and wherein said accessory is an electric cable joint, wherein the silicon carbide and the boron nitride are in the form of micrometric particles, and wherein the boron nitride is in the form of elongated particles, and wherein the silicon carbide is in the form of spherical particles.

14. Kit for connecting two electric cables by means of a joint as defined in claim 13, wherein said kit comprises:

boron nitride in the form of micrometric particles, silicon carbide in the form of micrometric particles, and at least one precursor of said polymer material, the abovementioned compounds being intended to form a crosslinkable composition, and a component for positioning or protecting the crosslinked layer, said component being configured to enable the application of the crosslinkable composition.

15. Electrical device according to claim 13, wherein the polymer material is chosen from polyorganosiloxanes.

* * * * *